US011482756B2

(12) United States Patent
Hayashi et al.

(10) Patent No.: US 11,482,756 B2
(45) Date of Patent: Oct. 25, 2022

(54) GAS VENT DUCT

(71) Applicant: TOYOTA JIDOSHA KABUSHIKI KAISHA, Toyota (JP)

(72) Inventors: Tsuyoshi Hayashi, Miyoshi (JP); Isao Takahashi, Toyota (JP); Kentaro Adachi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 16/737,454

(22) Filed: Jan. 8, 2020

(65) Prior Publication Data
US 2020/0235359 A1 Jul. 23, 2020

(30) Foreign Application Priority Data
Jan. 21, 2019 (JP) .............................. JP2019-007488

(51) Int. Cl.
*H01M 50/00* (2021.01)
*H01M 50/30* (2021.01)
*B60K 1/04* (2019.01)

(52) U.S. Cl.
CPC ............... *H01M 50/30* (2021.01); *B60K 1/04* (2013.01); *H01M 2220/20* (2013.01)

(58) Field of Classification Search
CPC .. H01M 50/35; H01M 50/30; H01M 2220/20; Y02E 60/10
See application file for complete search history.

(56) References Cited

U.S. PATENT DOCUMENTS

| 2008/0000538 | A1* | 1/2008 | Jansen | ...................... F02K 9/58 137/870 |
| 2011/0159326 | A1* | 6/2011 | Oya | .................... H01M 10/625 429/82 |
| 2017/0299074 | A1 | 10/2017 | Masaki | |

FOREIGN PATENT DOCUMENTS

| CN | 107076322 A | 8/2017 |
| JP | 2017-050055 A | 3/2017 |

* cited by examiner

*Primary Examiner* — Cynthia H Kelly
*Assistant Examiner* — Monique M Wills
(74) *Attorney, Agent, or Firm* — Sughrue Mion, PLLC

(57) ABSTRACT

A gas vent duct includes a lower case, an upper case, and a valve element. The valve element includes a shaft at its upper part and pivots on the shaft from a blocking position so that the gas vent pathway communicates with the outside of the vehicle compartment. The blocking position is a position in which the valve element blocks the ventilation pathway. The lower case includes a support supporting the shaft so that the valve element is pivotable. The support covers the shaft from above. A recess is defined by a portion of the inner surface of the upper case that is located above the support, the recess being recessed upward. When the recess and the support are seen from above, at least a part of the support is located within the recess.

3 Claims, 8 Drawing Sheets

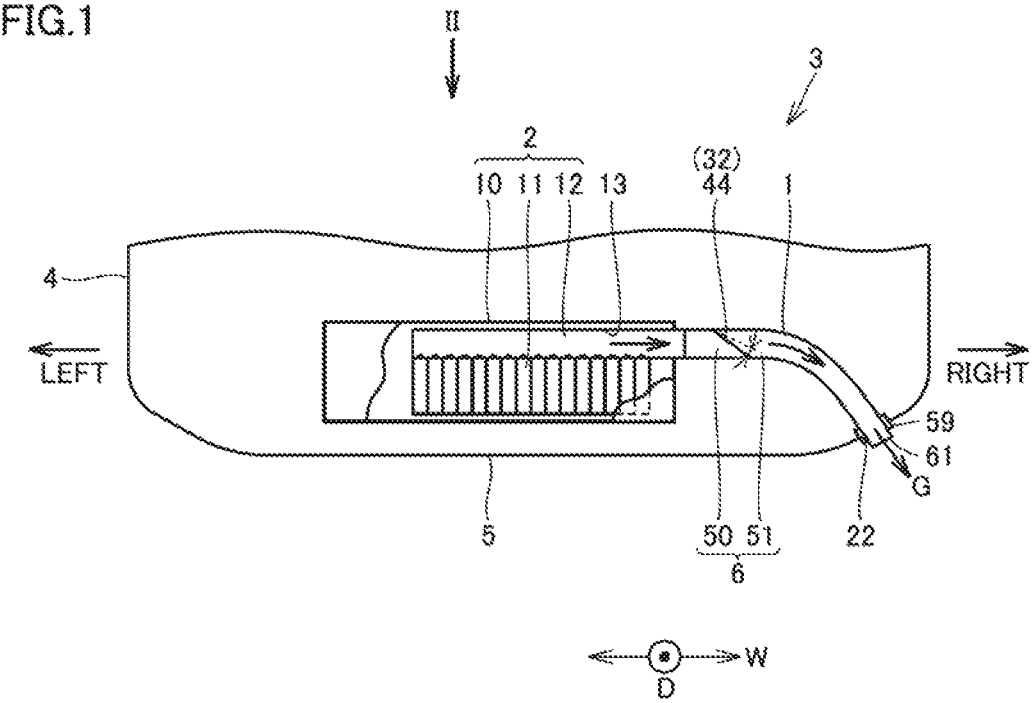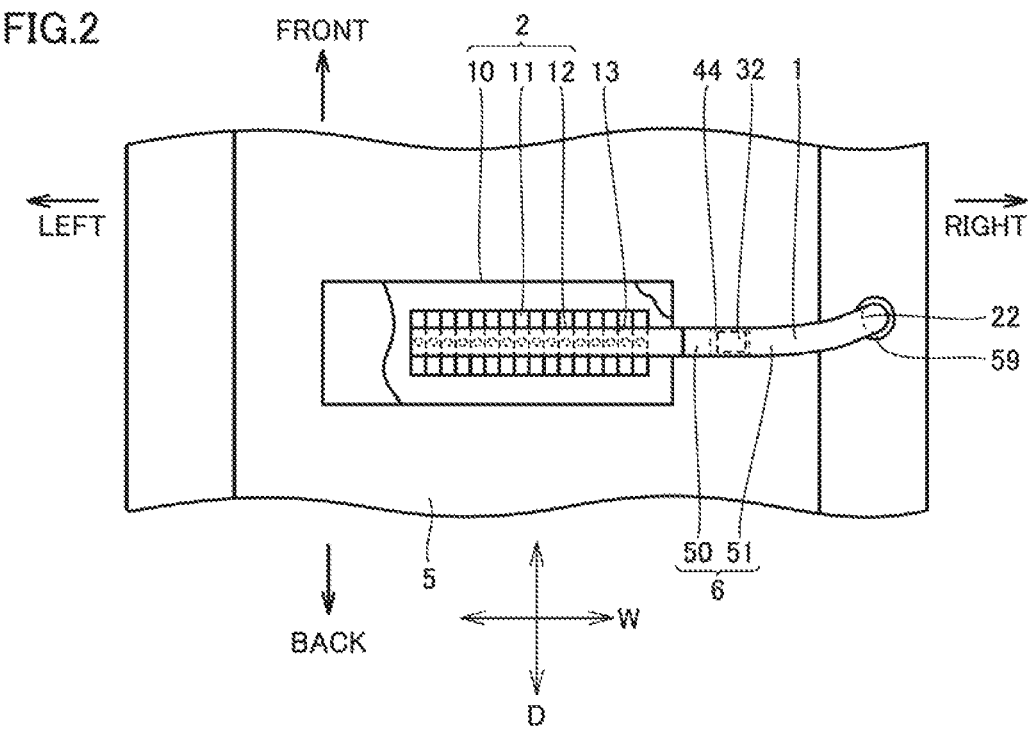

GAS VENT DUCT

BACKGROUND

This nonprovisional application is based on Japanese Patent Application No. 2019-007488 filed on Jan. 21, 2019 with the Japan Patent Office, the entire contents of which are hereby incorporated by reference.

FIELD

The present disclosure relates to a gas vent duct.

DESCRIPTION OF THE BACKGROUND ART

An electric storage device mounted on a vehicle includes a plurality of unit batteries, such as, for example, lithium-ion batteries and nickel metal hydride batteries.

When a unit battery is overcharged or has an internal short-circuit for example, the unit battery emits gas. Accordingly, an electric storage device typically has a gas vent pathway to let the gas out.

For example, an electric storage device described in Japanese Patent Laying-Open No. 2017-050055 includes a plurality of unit batteries, a gas vent pathway connected to the unit batteries, and a casing containing the unit batteries and the gas vent pathway.

To the casing, a gas vent duct is connected. The gas vent duct has a check valve to restrict a flow of air from the outside of the vehicle compartment to the electric storage device.

The check valve, disposed in the gas vent duct, includes a seat having an opening, and a valve element pivotable on the seat. The seat partitions the gas vent duct into the outer vehicle compartment side and the electric storage device side.

The valve element has a hinge structure pivotable on the seat and is disposed on the outer side of the vehicle compartment. In a normal state, the valve element closes the opening. When gas is emitted from a unit battery and flows into the gas vent duct, the gas pushes and pivots the valve element to uncover the opening.

SUMMARY

In the gas vent duct described in Japanese Patent Laying-Open No. 2017-050055, a change in ambient temperature may cause condensation in the gas vent duct, or foreign matter (e.g., dust) may enter the gas vent duct from the outside of the vehicle compartment.

The dew condensation water and foreign matter entering the hinge structure of the valve element may immobilize the valve element.

The present disclosure has been made in view of this problem. An object of the present disclosure is to provide a gas vent duct that allows a gas vent pathway in an electric storage device to communicate with the outside of a vehicle compartment, where a valve element in the gas vent duct is less likely to be immobilized even if dew condensation water arises in the gas vent duct or even if foreign matter enters the gas vent duct.

A gas vent duct according to the present disclosure is a gas vent duct having a ventilation pathway defined therein so that the gas vent duct allows a gas vent pathway in an electric storage device to communicate with outside of a vehicle compartment. The gas vent duct includes: a lower case; an upper case covering the lower case from above the lower case; and a valve element disposed in the lower case so that the valve element restricts a flow of air from the outside of the vehicle compartment toward the gas vent pathway. The valve element includes a shaft at an upper part thereof and pivots on the shaft from a blocking position so that the gas vent pathway communicates with the outside of the vehicle compartment, the blocking position being a position in which the valve element blocks the ventilation pathway. The lower case includes a support supporting the shaft so that the valve element is pivotable. The support covers the shaft from above. A recess is defined by a portion of an inner surface of the upper case that is located above the support, the recess being recessed upward. When the recess and the support are seen from above, at least a part of the support is located within the recess.

According to the gas vent duct, a recess is formed above the support. When condensation occurs in the gas vent duct, dew condensation water may adhere to the inner surface of the recess. At this time, the dew condensation water adhering to the inner surface of the recess easily runs down the inner surface of the recess and drips down from the opening edge of the recess. However, since at least a part of the support is located within the recess when the recess and the support are seen from above, the dew condensation water dripping from the opening edge of the recess can be prevented or restricted from adhering to the support.

Further, since the support covers the shaft from above, the dew condensation water dripping from the inner surface of upper case onto the support, if any, can be prevented or restricted from adhering to the shaft or entering the support. Also, if any foreign matter enters the gas vent duct, the foreign matter can be prevented or restricted from entering the support.

Since water and foreign matter can be prevented or restricted from entering the support, there is less risk that water and foreign matter may be formed into solid matter on the shaft and in the support.

The gas vent duct includes a partition wall having an opening and partitioning the ventilation pathway into a first pathway and a second pathway, the first pathway communicating with the gas vent pathway, the second pathway communicating with the outside of the vehicle compartment. The partition wall is inclined downward in a direction from the first pathway toward the second pathway. A drainage channel is defined by a portion of the partition wall that is located below a lower end of the support and above the opening.

According to the gas vent duct, when the dew condensation water etc. adhering to the outer surface of the support drips down from the support, the dew condensation water easily enters the drainage channel and thus can be prevented or restricted from entering the opening.

The electric storage device is mounted on a vehicle, and the drainage channel extends in a front-back direction of the vehicle.

According to the gas vent duct, when the vehicle speeds up or slows down, the water that has entered the drainage channel can be moved to be discharged.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 is a cross-sectional view schematically showing a vehicle 3 having a gas vent duct 1 and an electric storage device 2 mounted thereon.

FIG. 2 is a plan view of FIG. 1 seen from direction II.

DESCRIPTION OF THE PREFERRED EMBODIMENTS

Figure 3:
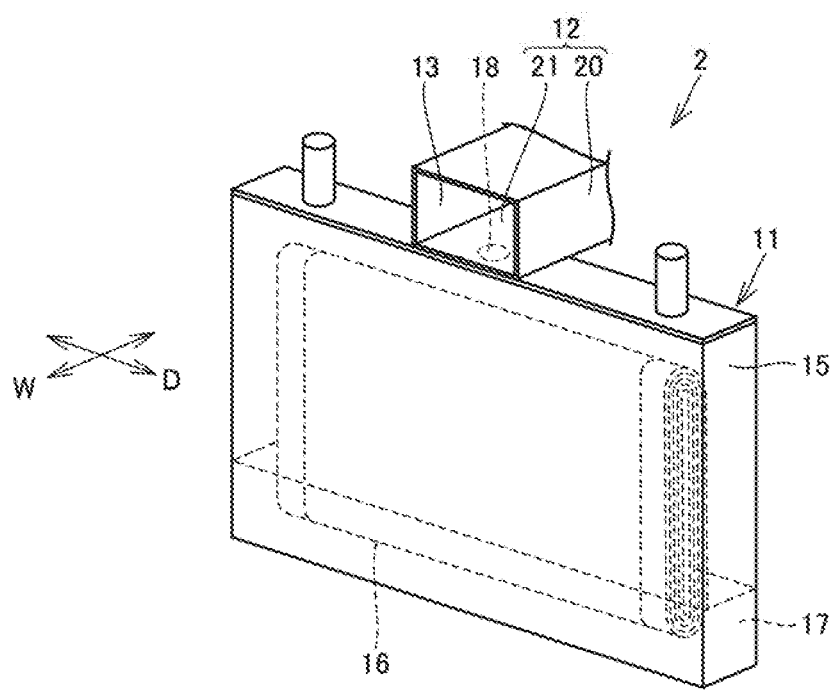
FIG. 3 is a perspective view showing a unit battery 11 and a duct 12.

A gas vent duct according to the present embodiment will now be described with reference to FIGS. 1 to 13. Among the components shown in FIGS. 1 to 13, identical or substantially identical components are denoted by identical reference signs, and redundant description is omitted. The components recited in the claims may be written in parentheses along with the corresponding components recited in the embodiment.

FIG. 1 is a cross-sectional view schematically showing vehicle 3 having gas vent duct 1 and electric storage device 2 mounted thereon. FIG. 1 is a cross-sectional view of a part of a vehicle as seen in vehicle-width direction W. FIG. 2 is a plan view of FIG. 1 seen from direction II. FIGS. 1 and 2 show electric storage device 2 in partially broken view so that the inside of electric storage device 2 is visible.

Vehicle 3 includes a vehicle body 4 having a floor panel 5. Floor panel 5 is a metal plate that forms the bottom of vehicle 3.

Electric storage device 2 is disposed on the upper surface of floor panel 5. Electric storage device 2 includes a battery case 10, a plurality of unit batteries 11, and a duct 12. The plurality of unit batteries 11 and duct 12 are disposed in battery case 10.

Unit batteries 11 are arranged in vehicle-width direction W. Duct 12 also extends in vehicle-width direction W and passes above the upper surfaces of unit batteries 11.

FIG. 3 is a perspective view showing unit battery 11 and duct 12. FIG. 3 shows duct 12 in partially broken view. Unit battery 11 includes a casing 15, an electrode 16, and electrolyte solution 17. Casing 15 has a valve 18 on its upper surface. When the internal pressure in casing 15 increases, valve 18 ruptures to allow the internal space of casing 15 to communicate with the outside of casing 15.

Unit battery 11 is, for example, a lithium-ion battery. When an internal short-circuit occurs in electrode 16 in unit battery 11, an exothermic reaction may be promoted in casing 15 accompanied by generation of gas.

The gas generated in casing 15 would increase the internal pressure in casing 15. When the internal pressure in casing 15 increases to above a certain pressure, valve 18 ruptures to let the gas out.

Duct 12 passes above valves 18 of unit batteries 11 and defines a gas vent pathway 13. Duct 12 includes a duct body 20 having an opening that opens downward, and a cover 21 to close the opening of duct body 20. Cover 21 is made of a material that melts when exposed to high-temperature gas emitted from valve 18. Duct 12 is drawn from the inside of battery case 10 to the outside of battery case 10.

Referring back to FIGS. 1 and 2, gas vent duct 1 is connected to the end of duct 12 that is located outside of battery case 10. In the example shown in FIGS. 1 and 2, the end of duct 12 is located on the right side of vehicle 3.

In gas vent duct 1, ventilation pathway 6 is defined. Ventilation pathway 6 communicates with gas vent pathway 13 of duct 12.

Gas vent duct 1 extends from the end of duct 12 in vehicle-width direction W and is inserted in an insertion hole 22 defined by floor panel 5. In the present embodiment, gas vent duct 1 extends from the end of duct 12 to the right side of vehicle 3. The end of gas vent duct 1 passes through insertion hole 22 and opens toward the outside of the vehicle compartment.

Figure 4:
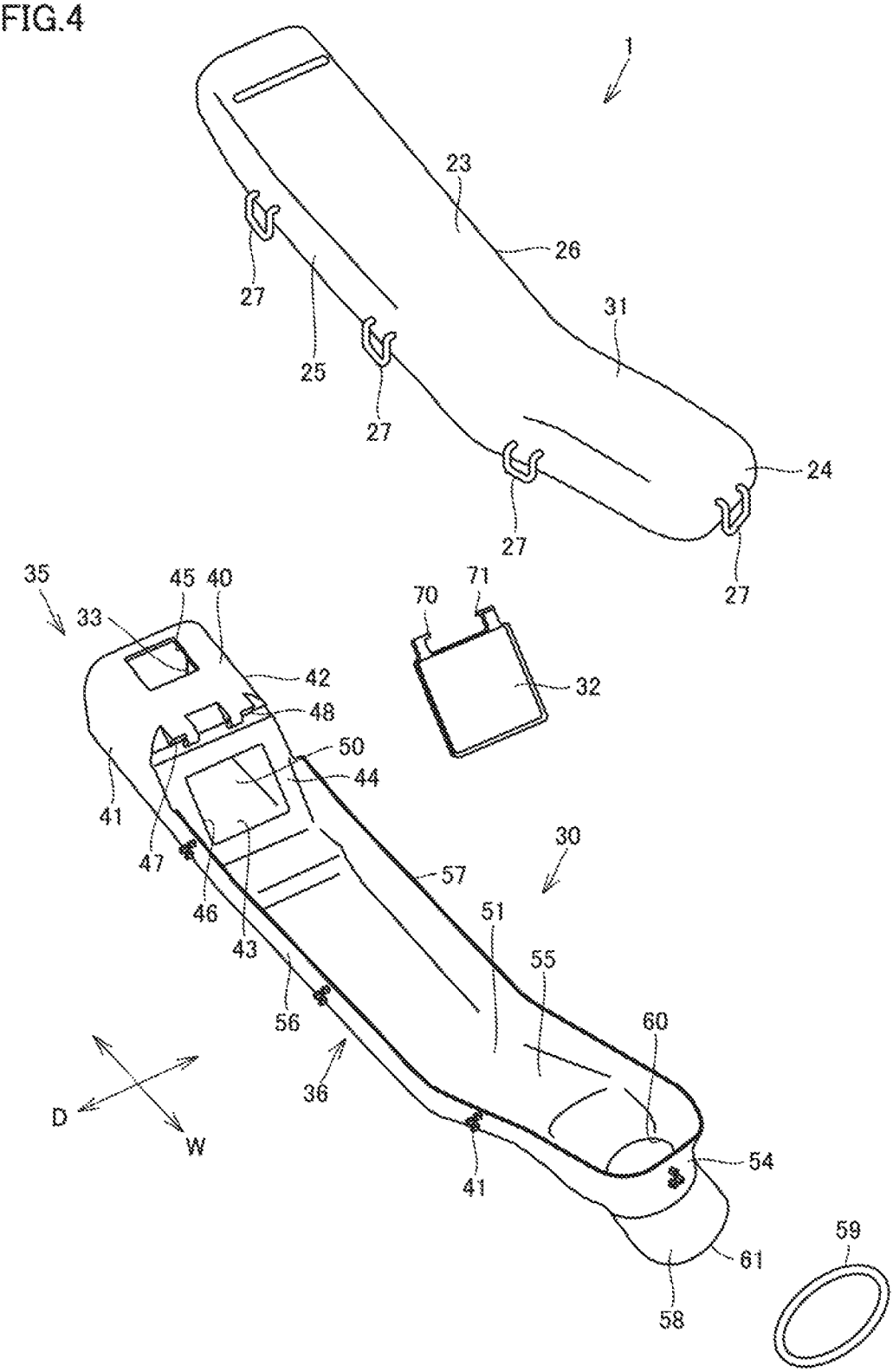
FIG. 4 is an exploded perspective view showing gas vent duct 1.

FIG. 4 is an exploded perspective view showing gas vent duct 1. Gas vent duct 1 includes a lower case 30, an upper case 31, and a valve element 32.

Upper case 31 opens downward. Upper case 31 includes a top plate 23, an end plate 24, sidewalls 25, 26, and a plurality of engagement portions 27. End plate 24 and sidewalls 25, 26 extend downward from the peripheral edge of top plate 23. Engagement portions 27 are disposed at end plate 24 and sidewalls 25, 26.

Lower case 30 includes a connection case 35 to which the end of duct 12 is connected, and a lower cover 36 connected to connection case 35.

Connection case 35 has a communication hole 33 communicating with gas vent pathway 13 of duct 12 connected to connection case 35. Connection case 35 includes a top plate 40, a sidewall 41, a sidewall 42, a bottom plate 43, a partition wall 44, and supports 47, 48.

Top plate 40 has an engagement hole 45. Engagement hole 45 receives an engagement portion of duct 12 for engagement. Thus, duct 12 is coupled to gas vent duct 1.

Sidewalls 41 and 42 are disposed opposite to each other in vehicle-front-back direction D. Sidewall 41 extends downward from a lateral side of top plate 40, on one side in vehicle-front-back direction D. Sidewall 42 extends downward from another lateral side of top plate 40, on the other side in vehicle-front-back direction D. Bottom plate 43 connects the lower side of sidewall 41 and the lower side of sidewall 42. Communication hole 33 is located at one end of connection case 35 in vehicle-width direction W.

Partition wall 44 is located at the other end of connection case 35. As shown also in FIGS. 1 and 2, partition wall 44 partitions ventilation pathway 6 in gas vent duct 1 into an upstream pathway (first pathway) 50 and a downstream pathway (second pathway) 51.

Partition wall 44 has an opening 46. Valve element 32 is pivotably supported by supports 47, 48 so that valve element 32 can close opening 46. The detailed configuration of valve element 32 and supports 47, 48 is described later.

Lower cover 36 is connected to connection case 35. Lower cover 36 extends from connection case 35 in vehicle-width direction W (rightward with respect to the vehicle) and curves downward. Lower cover 36 opens upward.

Lower cover 36 includes an end plate 54, a bottom plate 55, sidewalls 56, 57, an insertion cylinder 58, and a grommet 59.

End plate 54 is located at an end of lower cover 36. Bottom plate 55 is integrated with bottom plate 43 of connection case 35. Bottom plate 55 has an opening 60 at its end in vehicle-width direction W (at the right end of the vehicle).

Sidewalls 56 and 57 are spaced from each other in vehicle-front-back direction D. Sidewall 56 extends upward from a lateral side of bottom plate 55, on one side in vehicle-front-back direction D. Sidewall 57 extends upward from another lateral side of bottom plate 55, on the other side. Sidewall 56 is integrated with sidewall 41 of connection case 35, and sidewall 57 is integrated with sidewall 42 of connection case 35.

Insertion cylinder 58 is connected to opening 60 in bottom plate 55, and extends downward from the lower surface of bottom plate 55.

Grommet 59 is disposed on the periphery of insertion cylinder 58 and is attached to insertion hole 22 as shown in FIG. 1. Insertion cylinder 58 passes through grommet 59 and insertion hole 22 and reaches the outside of the vehicle compartment. Insertion cylinder 58 has a vent 61 at its end.

Figure 5:
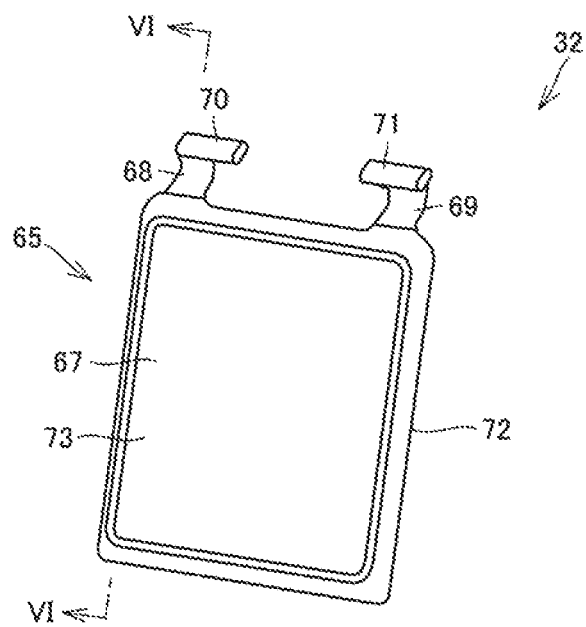
FIG. 5 is a perspective view showing a valve element 32.
Figure 6:
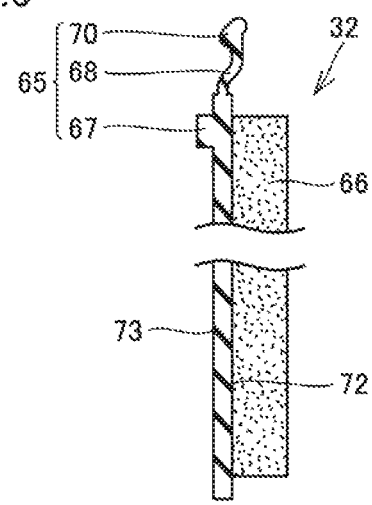
FIG. 6 is a cross-sectional view showing valve element 32.

FIG. 5 is a perspective view showing valve element 32. FIG. 6 is a cross-sectional view showing valve element 32. Valve element 32 includes a resin plate 65 in the form of a plate and a shock-absorbing member 66 disposed on resin plate 65.

Resin plate 65 is in the form of a plate and is made of, for example, a resin with high rigidity and high thermal resistance, such as polypropylene.

Valve element 32 includes a body plate 67, protrusions 68, 69, and shafts 70, 71. Body plate 67 is in the form of a plate, and includes a principal surface 72 and a principal surface 73 arranged in the thickness direction of body plate 67. Principal surface 72 is located on the partition wall 44 side.

Protrusions 68 and 69 are formed on the upper side of valve element 32 with a space between protrusions 68 and 69, and protrude upward from the upper side of valve element 32.

Shaft 70 is formed at protrusion 68, and shaft 71 is formed at protrusion 69. Shaft 70 protrudes toward protrusion 69, and shaft 71 protrudes toward protrusion 68.

Shock-absorbing member 66 is disposed on principal surface 72. Shock-absorbing member 66 may be, for example, a porous material (e.g., seal sponge), or may be a rubber. Shock-absorbing member 66 is in contact with partition wall 44 when opening 46 is closed by valve element 32. Shock-absorbing member 66 can deaden the noise from valve element 32 hitting partition wall 44 when partition wall 44 is opened and closed.

Figure 7:
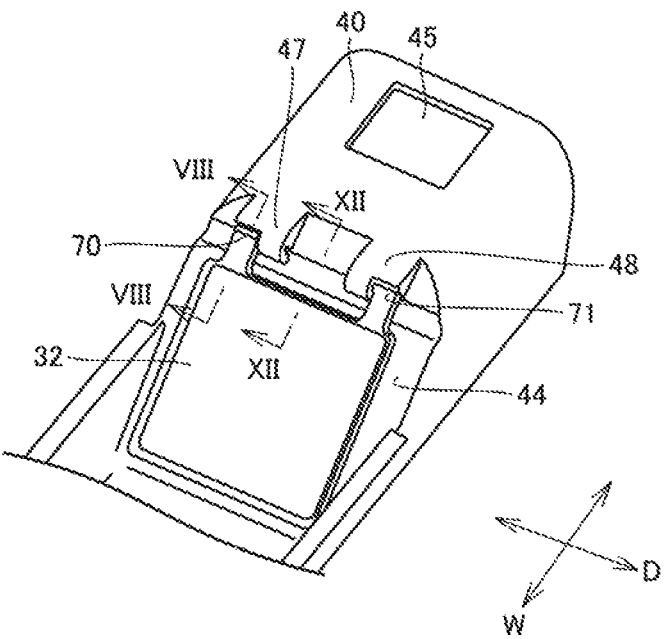
FIG. 7 is a perspective view showing the configuration of valve element 32 and the nearby components.

FIG. 7 is a perspective view showing the configuration of valve element 32 and the nearby components. Supports 47, 48 are formed at partition wall 44. Support 47 and support 48 are spaced from each other in vehicle-front-back direction D. Support 47 pivotably supports shaft 70, and support 48 pivotably supports shaft 71. Here, the configuration of support 47 is described in detail, as support 48 has the same configuration as support 47.

Figure 8:
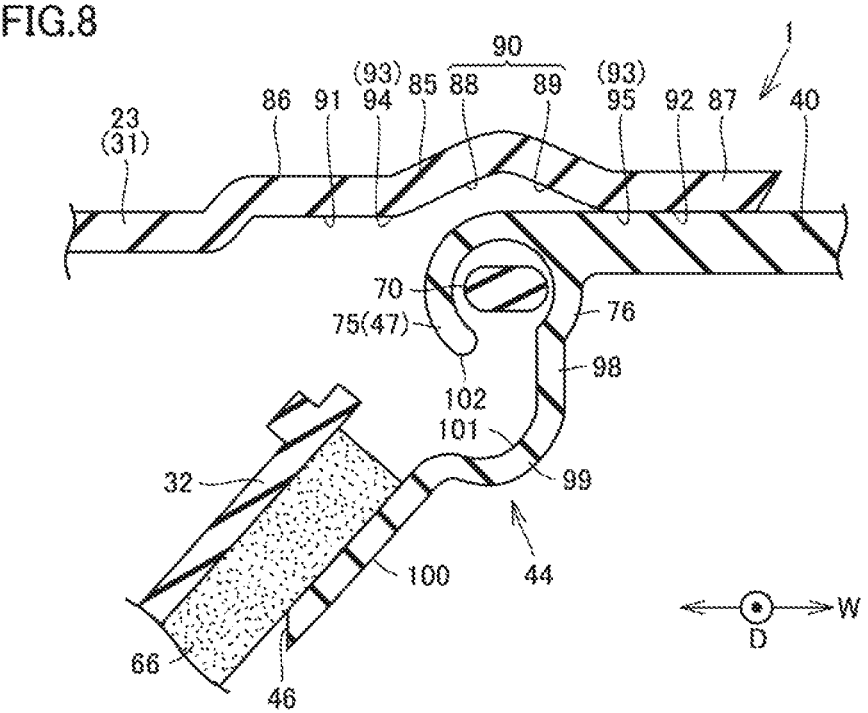
FIG. 8 is an end view taken along line VIII-VIII in FIG. 7.

FIG. 8 is an end view taken along line VIII-VIII in FIG. 7. Specifically, FIG. 8 shows an end view in an imaginary plane extending in vehicle-front-back direction D. Support 47 wraps shaft 70 from above. Support 47 includes a nail 75 and a receiving portion 76.

Nail 75 protrudes in vehicle-width direction W from the boundary between top plate 40 and partition wall 44 and passes above shaft 70, then passes through the location adjacent to shaft 70 in the horizontal direction, and then reaches the location below shaft 70. The inner surface of nail 75 is in the shape of a circular arc.

Receiving portion 76, which constitutes a part of partition wall 44, is connected to an edge of top plate 40 and is located opposite to nail 75 with respect to shaft 70. Receiving portion 76 also curves in the shape of a circular arc. A gap 79 is defined between the lower end of nail 75 and receiving portion 76. Gap 79 extends in vehicle-front-back direction D.

Figure 9:
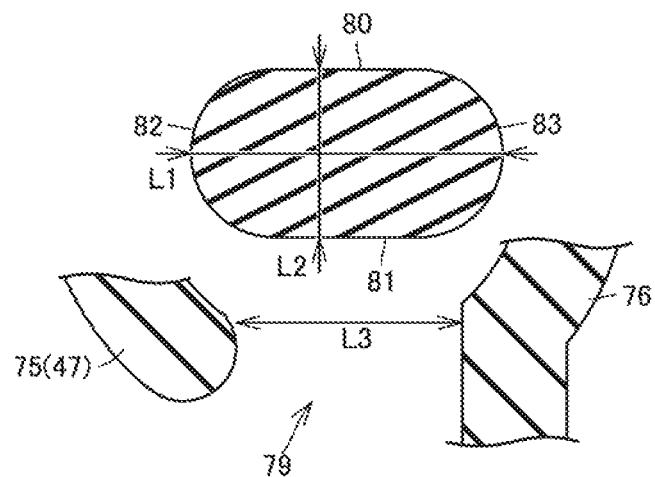
FIG. 9 is an end view showing the configuration of a shaft 70 and the nearby components.

FIG. 9 is an end view showing the configuration of shaft 70 and the nearby components. Shaft 70 extends in vehicle-front-back direction D. When seen in end view taken along an imaginary plane perpendicular to vehicle-front-back direction D, shaft 70 has an ellipse shape. The periphery of shaft 70 includes long side surfaces 80, 81 and circular-arc surfaces 82, 83.

Shaft 70 has a minor axis extending in a direction passing through long side surfaces 80 and 81, and has a major axis passing through circular-arc surfaces 82 and 83. Length L1 of shaft 70 in the major-axis direction is longer than length L2 of shaft 70 in the minor-axis direction. Length L1 is longer than length L3 of gap 79 in vehicle-width direction W.

When opening 46 is closed by valve element 32, long side surface 81 faces gap 79. This prevents shaft 70 from slipping out of support 47 when opening 46 is closed by valve element 32.

Referring back to FIG. 8, top plate 23 of upper case 31 has a bulging portion 85 and flat portions 86, 87. Bulging portion 85, which bulges upward, is formed at the portion of upper case 31 that is located above support 47. Flat portion 86 is formed at the location adjacent to bulging portion 85 on one side in vehicle-width direction W, and flat portion 87 is formed at the location adjacent to bulging portion 85 on the other side.

Figure 10:
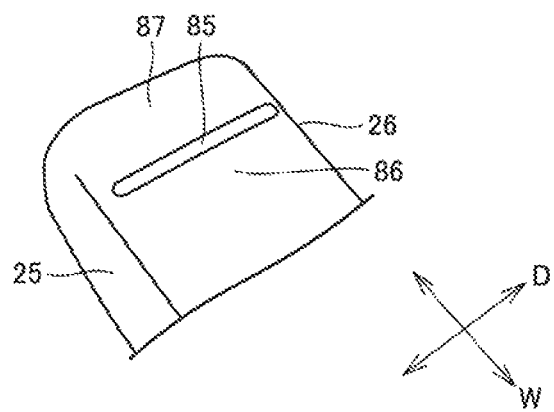
FIG. 10 is a perspective view showing a bulging portion 85 and flat portions 86, 87.

FIG. 10 is a perspective view showing bulging portion 85 and flat portions 86, 87. As shown in FIG. 10, bulging portion 85 is elongated in vehicle-front-back direction D. Bulging portion 85 has one end reaching the vicinity of sidewall 25, and the other end reaching the vicinity of sidewall 26.

Referring back to FIG. 8, the inner surface of upper case 31 includes the inner surface of a recess 90 defined by bulging portion 85, a flat surface 91 which constitutes the inner surface of flat portion 86, and a flat surface 92 which constitutes the inner surface of flat portion 87. Recess 90 curves upward with the increasing distance from opening edge 93 of recess 90.

Figure 11:
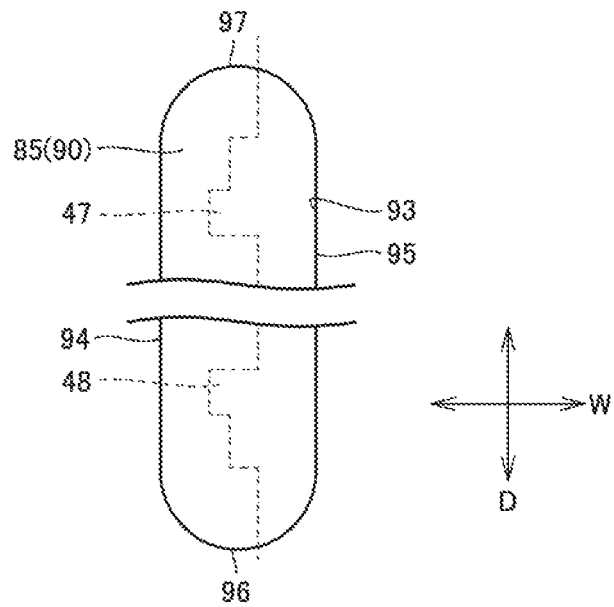
FIG. 11 is a plan view showing supports 47, 48 and a recess 90 seen from above.

FIG. 11 is a plan view showing supports 47, 48 and recess 90 seen from above. As shown in FIG. 11, supports 47, 48 are located within recess 90. Opening edge 93 of recess 90 has longer sides 94, 95 and shorter sides 96, 97. Longer side 94 is at a distance from supports 47, 48 in one direction of vehicle-width direction W (rightward with respect to the vehicle 3). Longer side 95 is at a distance from supports 47, 48 in the other direction of vehicle-width direction W (leftward with respect to the vehicle 3).

Referring back to FIG. 8, the inner surface of recess 90 includes an inclined surface 88 and an inclined surface 89. Inclined surface 88 extends from the center of recess 90 to longer side 94, inclining downward toward longer side 94. Inclined surface 89 extends from the center of recess 90 to longer side 95, inclining downward toward longer side 95.

Partition wall 44 includes receiving portion 76, a hanging portion 98, a curved portion 99, and an inclined portion 100. Hanging portion 98 extends downward from the lower edge of receiving portion 76, and curved portion 99 is connected to the lower edge of hanging portion 98. Inclined portion 100 is connected to hanging portion 98.

Curved portion 99 defines a drainage channel 101. Drainage channel 101 is located below lower end 102 of nail 75. As shown in FIG. 8, drainage channel 101 extends in vehicle-front-back direction D.

Drainage channel 101 has one end reaching sidewall 41, and the other end reaching sidewall 42. When upper case 31 is fixed to lower case 30, outlets which communicate with drainage channel 101 are formed on both sides of gas vent duct 1.

Figure 12:
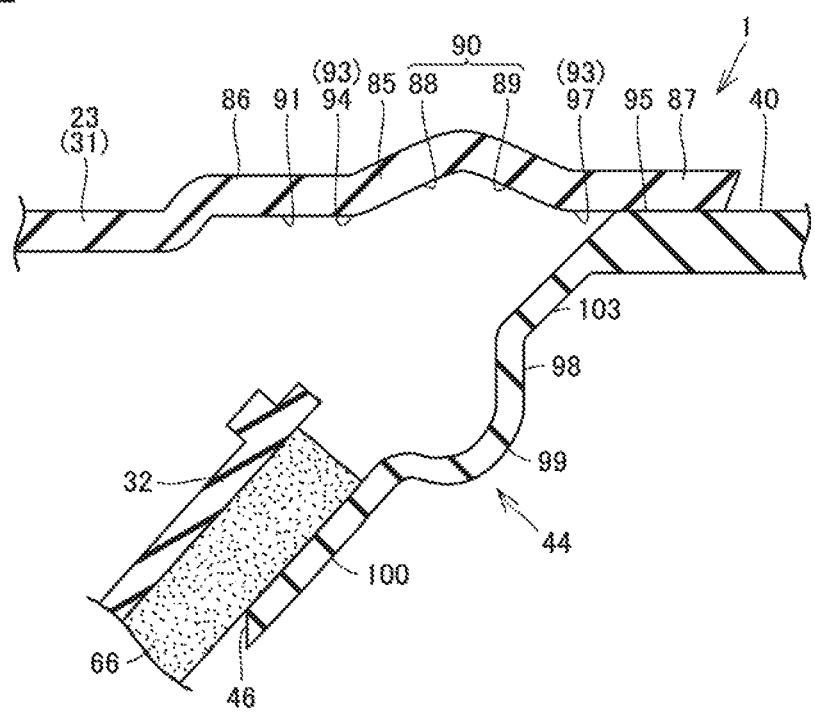
FIG. 12 is an end view taken along line XII-XII in FIG. 7.

FIG. 12 is an end view taken along line XII-XII in FIG. 7. FIG. 12 shows an end view of a part between support 47 and support 48. The part of partition wall 44 that is located between support 47 and support 48 includes an inclined portion 103. Inclined portion 103 has a lower side connected to curved portion 99, and an upper side connected to top plate 40.

In gas vent duct 1 and electric storage device 2 configured as described above, a description will now be given to the path for venting high-temperature gas emitted from unit battery 11.

In FIGS. 1 and 2, high-temperature gas, when emitted from unit battery 11, enters duct 12. High-temperature gas G that has entered duct 12 flows through gas vent pathway 13 in duct 12 and enters ventilation pathway 6 in gas vent duct 1.

Specifically, high-temperature gas G enters connection case 35 in gas vent duct 1 and then enters upstream pathway 50. High-temperature gas G then pushes valve element 32. When pushed by high-temperature gas G, valve element 32 pivots as indicated by the broken line in FIG. 1.

By pivoting, valve element 32 moves from the position where opening 46 is closed by valve element 32, to the position where opening 46 is uncovered.

High-temperature gas G then enters downstream pathway 51 from upstream pathway 50 through opening 46. High-temperature gas G then passes through downstream pathway 51 and is discharged from the vehicle compartment through vent 61.

Thus, even if high-temperature gas G is emitted from unit battery 11, it can be smoothly discharged from the vehicle compartment. When high-temperature gas G is not being emitted from unit battery 11, opening 46 is closed by valve element 32. Therefore, if any foreign matter (e.g., dust) enters through vent 61, the foreign matter is prevented or restricted from entering upstream pathway 50.

With reference to FIG. 8, a description will now be given to a situation in which condensation occurs on the inner surface of gas vent duct 1.

When condensation occurs in gas vent duct 1, dew condensation water may adhere to the surface of recess 90 and flat surface 91. However, since flat surface 91 is at a distance from support 47 in vehicle-width direction W, the dew condensation water, even if dripping down from flat surface 91, can be prevented or restricted from adhering to support 47.

For example, the dew condensation water adhering to recess 90 may run down inclined surface 88 and drip down from longer side 94. However, since longer side 94 is at a distance from support 47 in vehicle-width direction W, the dripping dew condensation water can be prevented or restricted from adhering to support 47.

Even if the dew condensation water adhering to inclined surface 88 or other surfaces drips onto support 47, the dripping dew condensation water will adhere not to shaft 70 but to the outer surface of support 47 because support 47 covers shaft 70 from above. Therefore, the dripping dew condensation water can be prevented or restricted from directly adhering to shaft 70.

Nail 75 of support 47 curves from above to below shaft 70, and lower end 102 of nail 75 is located below shaft 70. Accordingly, even if the dew condensation water adhering to support 47 runs down the outer surface of support 47 and drips down from lower end 102, the dew condensation water can be prevented or restricted from entering support 47.

Also, the dew condensation water can be prevented or restricted from entering support 47 if condensation directly occurs on the outer surface of support 47 or if the dew condensation water on inclined surface 89 runs down and adheres to the outer surface of support 47.

At the time of a flood disaster or the like, vehicle 3 may be submerged in water or run in deep puddles of water. In such cases, water may enter vehicle 3 and enter gas vent duct 1 through the gap between top plate 40 and flat portion 87.

If any water enters gas vent duct 1 through the gap between top plate 40 and flat portion 87, the water runs down the outer surface of support 47 and drips from lower end 102. Thus, the water can be prevented or restricted from entering support 47 or adhering to shaft 70.

In some cases, foreign matter may enter downstream pathway 51 from the outside of the vehicle compartment through vent 61. Even if the foreign matter enters support 47, the foreign matter can easily drop from support 47 through gap 79 defined by support 47 because gap 79 opens downward. Thus, the foreign matter does not easily accumulate in support 47.

Thus, water and foreign matter are prevented or restricted from adhering to the inner surface of support 47 and shaft 70. In some cases, a mixture of foreign matter and water may dry into solid matter on the inner surface of support 47 or the surface of shaft 70, which may prevent shaft 70 from pivoting. When shaft 70 is prevented from pivoting, valve element 32 is also difficult to pivot. Then valve element 32 may fail to pivot when high-temperature gas G is emitted, failing to discharge high-temperature gas G to the outside of the vehicle compartment.

By contrast, in gas vent duct 1 according to the present embodiment, water is less likely to adhere to the inner surface of support 47 and shaft 70, and foreign matter is less likely to accumulate in support 47, thus reducing the occurrence of such inconveniences.

Although shaft 70 and support 47 have been mainly described, shaft 71 and support 48 have the same configuration as shaft 70 and support 47 and can reduce the occurrence of immobilization of shaft 71 in the same manner.

Consideration will now be given to the water droplets running down the surface of support 47 and dripping down from lower end 102. Since drainage channel 101 lies below lower end 102, the water dripping from lower end 102 enters drainage channel 101.

Drainage channel 101, which is located above opening 46, can prevent or restrict water from reaching the gap between valve element 32 and the opening edge of opening 46, and thus from reaching electric storage device 2.

When opening 46 is closed by valve element 32, drainage channel 101 is located above shock-absorbing member 66. Accordingly, the water dripping from lower end 102 can be prevented or restricted from reaching shock-absorbing member 66, thus reducing the deterioration of shock-absorbing member 66.

Drainage channel 101, which is connected to the outlets located at both ends of drainage channel 101, allows the water that has entered drainage channel 101 to be discharged to the outside of gas vent duct 1.

Drainage channel 101 extends in vehicle-front-back direction D. Accordingly, when vehicle 3 speeds up or slows down, the water can easily flow through drainage channel 101 and can be easily discharged from the outlets. This can prevent or restrict the water from accumulating in drainage channel 101 and overflowing from drainage channel 101.

Figure 13:
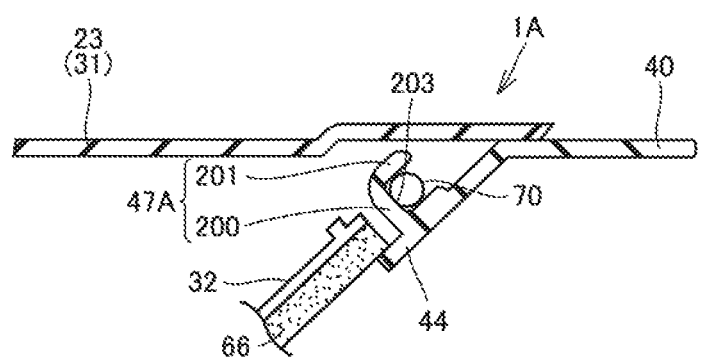
FIG. 13 is an end view showing a gas vent duct 1A according to a comparative example.

FIG. 13 is an end view showing gas vent duct 1A according to a comparative example. The end view in FIG. 13 corresponds to FIG. 8.

Gas vent duct 1A includes a support 47A pivotably supporting shaft 70 and another support (not shown). Support 47A and the other support have substantially the same configuration.

In gas vent duct 1A, top plate 23 of upper case 31 does not have bulging portion 85 and recess 90, and partition wall 44 does not have drainage channel 101.

Gas vent duct 1A substantially has the same configuration as gas vent duct 1 according to the present embodiment except that support 47A and the other support are different in configuration from support 47 and support 48, that gas vent duct 1A does not have bulging portion 85 and recess 90, and that partition wall 44 does not have drainage channel 101.

Support 47A has a bottom portion 200 and upright wall 201 which define a ditch 203 for receiving shaft 70. Ditch 203 opens upward.

With FIG. 13, a description will now be given to a situation in which condensation occurs in gas vent duct 1A. When condensation occurs in gas vent duct 1A, dew condensation water may arise at the portion of the inner surface of top plate 23 that is located above support 47A.

Since ditch 203 of support 47A opens upward, dew condensation water dripping from above support 47A would enter ditch 203.

Foreign matter entering gas vent duct 1A would easily enter ditch 203 and thus easily accumulate in ditch 203.

A mixture of foreign matter (e.g., dust) and water may dry into solid matter on the inner surface of ditch 203 or the outer surface of shaft 70, thus immobilizing shaft 70.

By contrast, gas vent duct 1 according to the present embodiment can reduce the occurrence of such inconveniences.

Although an embodiment of the present disclosure has been described, it should be understood that the embodiment disclosed herein is by way of example in every respect, not by way of limitation. The scope of the present disclosure is defined by the terms of the claims, and is intended to include any modification within the meaning and scope equivalent to the terms of the claims.

What is claimed is:

1. A gas vent duct having a ventilation pathway defined therein so that the gas vent duct allows a gas vent pathway in an electric storage device to communicate with outside of a vehicle compartment, the gas vent duct comprising:
    a lower case;
    an upper case covering the lower case from above the lower case; and
    a valve element disposed in the lower case so that the valve element restricts a flow of air from the outside of the vehicle compartment toward the gas vent pathway, wherein
    the valve element includes a shaft at an upper part thereof and pivots on the shaft from a blocking position so that the gas vent pathway communicates with the outside of the vehicle compartment, the blocking position being a position in which the valve element blocks the ventilation pathway,
    the lower case includes a support supporting the shaft so that the valve element is pivotable,
    the support covers the shaft from above,
    a recess is defined by a portion of an inner surface of the upper case that is located above the support, the recess being recessed upward,
    the inner surface of the upper case includes a bulging portion, a first flat surface, and a second flat surface,
    the first flat surface is disposed on a first direction side, in a vehicle-width direction, relative to the recess,
    the second flat surface is disposed on a second direction side, in the vehicle-width direction, relative to the recess,
    the recess curves upward with increasing distance from an opening edge of the recess,
    the opening edge includes a first edge located on a first flat surface side of the recess and a second edge located on a second flat surface side of the recess,
    the first edge is located on the first direction side relative to the support, and
    the second edge is located on the second direction side relative to the support.

2. The gas vent duct according to claim 1, further comprising a partition wall having an opening and partitioning the ventilation pathway into a first pathway and a second pathway, the first pathway communicating with the gas vent pathway, the second pathway communicating with the outside of the vehicle compartment, wherein
    the partition wall is inclined downward in a direction from the first pathway toward the second pathway, and
    a drainage channel is defined by a portion of the partition wall that is located below a lower end of the support and above the opening.

3. The gas vent duct according to claim 2, wherein
    the electric storage device is mounted on a vehicle, and
    the drainage channel extends in a front-back direction of the vehicle.

* * * * *